Figure 1:
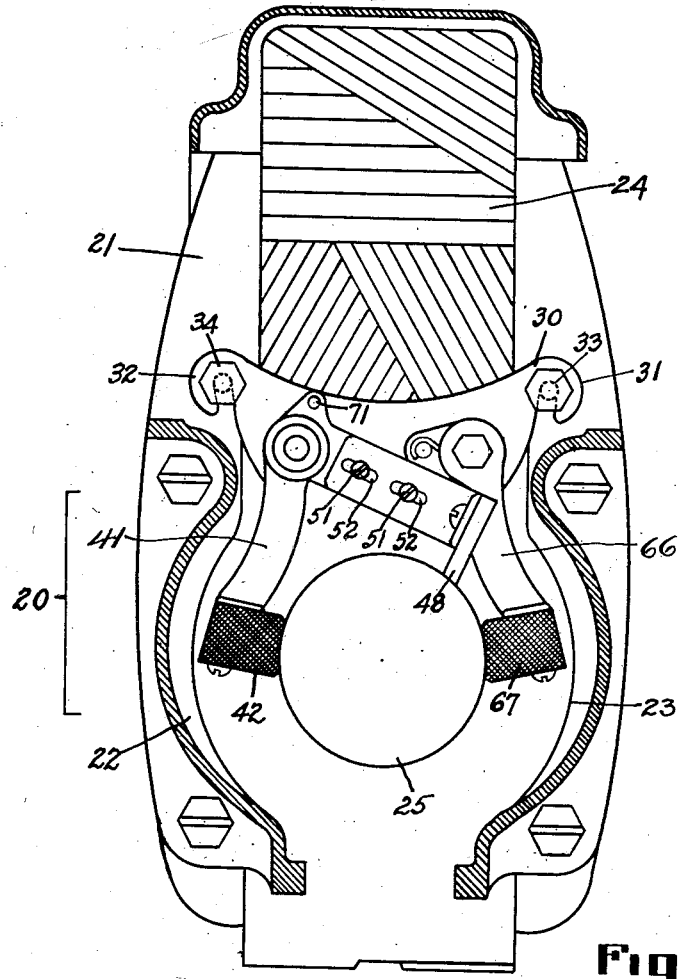

C. F. KETTERING AND W. A. CHRYST.
BRUSH MOUNTING.
APPLICATION FILED APR. 11, 1919.

1,405,519.

Patented Feb. 7, 1922.

WITNESSES
E. Richard Noe
Walter W. Riedel

INVENTORS
Charles F. Kettering
William A. Chryst
Kerr, Page, Cooper and Hayward
ATTORNEYS

UNITED STATES PATENT OFFICE.

CHARLES F. KETTERING AND WILLIAM A. CHRYST, OF DAYTON, OHIO, ASSIGNORS TO THE DAYTON ENGINEERING LABORATORIES COMPANY, A CORPORATION OF OHIO.

BRUSH MOUNTING.

1,405,519.     Specification of Letters Patent.     Patented Feb. 7, 1922.

Original application filed October 11, 1915, Serial No. 55,160. Divided and this application filed April 11, 1919. Serial No. 289,204.

*To all whom it may concern:*

Be it known that we, CHARLES F. KETTERING and WILLIAM A. CHRYST, citizens of the United States of America, residing at Dayton, county of Montgomery, State of Ohio, have invented certain new and useful Improvements in Brush Mountings, of which the following is a full, clear, and exact description.

This invention relates to dynamo electric machines, and has for one of the objects of the invention to provide improved means for mounting brushes of the dynamo in such a manner as to facilitate assembly in the manufacture of the machine, and removal therefrom in case of replacement or adjustment.

Other and further objects and advantages of the present invention will be apparent from the following description, reference being had to the accompanying drawings, wherein preferred embodiments of the present invention are clearly shown.

This application is a division of our copending application, Serial No. 55,160, filed October 11, 1915, and patented May 13, 1919, No. 1,303,831.

Figure 2:
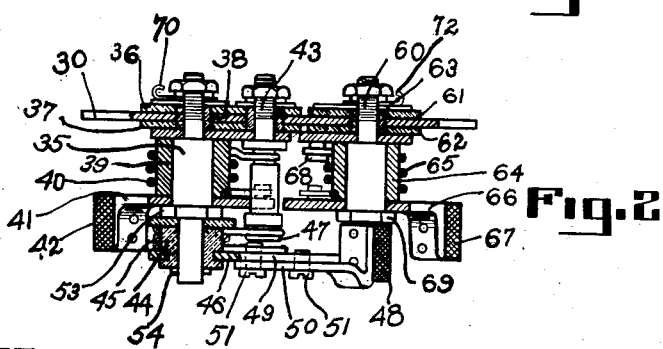

In the drawings:

Fig. 1 is an end view of a dynamo electric machine constructed in accordance with the present invention, the commutator housing being shown in section; and Fig. 2 is a top plan view of the brush holding device shown in Fig. 1, certain parts being shown in section.

In the drawings, a dynamo electric machine 20 is provided with a field frame 21 which includes pole pieces 22 and 23. A field winding 24 mounted on the frame, when energized by a passage of an electric current produces a magnetic field between the pole pieces 22 and 23. An armature, not shown, cooperates with this magnetic field to produce an electric current, and said armature is connected with a commutator 25.

A mounting plate 30 is provided with hooked portions 31 and 32 which engage over bolts 33 and 34 which are secured to the frame 21. A terminal bolt 35 passes through the mounting plate 30 and is thoroughly insulated therefrom by means of suitable washers 36 and 37 and a sleeve 38. This bolt 35 is provided with a sleeve 39 which forms a support for a spring 40, as well as a spacing block for the brush holder 41. This brush holder 41 carries one of the main commutator brushes 42 in such a position that it will readily engage with the generator commutator 25.

The spring 40, which tends to hold the commutator brush 42 in contact with its commutator, is connected at one end with the supplemental bolt 43, while the other end thereof is fastened to any suitable part of the brush arm 41.

Mounted on the extreme end of the bolt 35 there is an insulating sleeve 44, which carries a spring 45, one end of which is secured to the brush holder 46, while the other end thereof is also secured to the supplemental bolt 43, but is insulated therefrom in any suitable manner as by insulating collar or washer 47, in order that the brush holder 46 will be insulated from the supplemental bolt 43. The function of this spring 45 is to maintain the brush 48 in contact with the generator commutator.

The brush holder 46 is mounted adjacent to the insulating sleeve 44, and comprises a pair of plates 49 and 50, secured together by means of bolts 51, which pass through elongated slots 52 formed in the plate 49. By loosening these bolts 51 it will readily be seen that the brush arm 46 may be lengthened or shortened in order to adjust the brush 48 relatively to the commutator surface. A nut 53 having engagement with the terminal bolt 35 maintains the brush holder 41 in position, and a pin 54 passing through bolt 35 maintains brush holder 46 in position.

The mounting of the other main commutator brush upon the mounting plate 30 is similar to that of the brush 42. A terminal bolt 60 passes through mounting plate 30 and is insulated therefrom by means of washers 61 and 62 and a sleeve 63. Bolt 60 is provided with a sleeve 64, which forms a support for a spring 65, as well as a spacing block for the brush holder 66. This brush holder 65 carries the other main commutator brush 67 in such a position that it will readily engage with the generator commutator 25. The spring 65, which tends to hold the commutator brush 67 in contact with commutator 25 is connected at one end with a stud 68 supported by mounting plate 30 but insulated therefrom, while the other end of said spring 65 is fastened to any suitable part of the brush arm 66. A head 69 provided on the bolt 60 maintains the brush arm 66 in position.

The generator connections are the same as usually employed in the well known type of generator having a third brush regulation. One of the main leads of the generator and one end of the field winding may be attached to the terminal clip 70 which is secured upon the terminal bolt 35. The other end of field winding 24 is connected at 71 with the brush arm 46 which carries the supplemental or third brush 48. The other main lead of the generator is connected with the terminal clip 72 secured upon the terminal bolt 60.

It will be apparent from the foregoing description that the brushes of the dynamo electric machine together with the supporting means therefor have been combined in a unitary structure which may be secured in place upon the generator frame in a very simple manner. In order to remove the brushes from the generator for adjustment or replacement, it is only necessary to loosen the bolts 33 and 34 after which the mounting plate carrying the main brushes and the third brush may be removed as a unit from the machine. This structure is advantageous from a manufacturing standpoint, in that the brushes and brush support may be assembled together in a unitary structure separate from the assembling of the other parts of the dynamo. Additional advantages result from the easy removal of the brushes from the dynamo for cleaning and adjustment while in service.

While the form of mechanisms herein shown and described constitutes preferred forms of embodiments of the invention, it is to be understood that other forms might be adopted, all coming within the scope of the claims which follow.

1. In a dynamo electric machine; the combination with a field frame and a rotatable armature and commutator; main brushes cooperating with the commutator; a supplemental or regulating brush cooperating with the commutator; and means for mounting said brushes upon the generator frame, said means comprising in a unitary structure a mounting plate, terminal bolts secured upon the mounting plate but insulated therefrom, the main brush holders pivotally mounted upon the said terminal bolts and supporting the main brushes, and a supplemental brush holder carrying the supplement brush pivotally mounted upon one of the terminal bolts but insulated therefrom; and means for yieldingly maintaining said brush holders in engagement with the commutator.

2. In a dynamo electric machine, the combination with the dynamo frame and the commutator supported thereby; of brush mounting means and brushes supported thereby for cooperation with said commutator, said brush mounting means being removable as a unit from the machine without disassembling other portions of said machine.

3. In a dynamo electric machine, the combination with the dynamo frame and the commutator supported thereby; of brush mounting means and brushes supported thereby for cooperation with said commutator, said brush mounting means including a mounting plate for supporting said brushes; said plate having mounting provisions; and devices arranged to cooperate with said provisions to secure said mounting plate to said dynamo frame, and in a manner such that said plate may be removed without disassembling other portions of said machine.

4. In a dynamo electric machine, the combination with the dynamo frame and the commutator supported thereby; of brush mounting means and brushes supported thereby for cooperation with said commutator; said brush mounting means including a mounting plate for supporting said brushes; said plate having hook portions; and bolts arranged to be engaged by said hook portions, and having threaded engagement with said frame, whereby to secure said plate to said frame, the loosening of said bolts permitting removal of said mounting plate without disassembling other portions of said machine.

5. In a bipolar dynamo electric machine, the combination with the dynamo frame and the commutator supported thereby; of brushes disposed on opposite side of said commutator; brush mounting means including a mounting plate and brush holders supported thereby; said plate having mounting provisions; and devices arranged to cooperate with said provisions to secure said mounting plate to said dynamo frame, and in a manner such that said plate may be removed without disassembling other portions of said machine.

In testimony whereof we affix our signatures.

CHARLES F. KETTERING.
WILLIAM A. CHRYST.

Witnesses:
HAZEL SOLLENBERGER,
MILDRED PEARE.